United States Patent
Horner et al.

(10) Patent No.: US 7,686,680 B2
(45) Date of Patent: Mar. 30, 2010

(54) CLOSED-LOOP CABIN PRESSURE CONTROL SYSTEM TEST METHOD WITH ACTUAL PRESSURE FEEDBACK

(75) Inventors: Darrell W. Horner, Oro Valley, AZ (US); Timothy C. Biss, Tucson, AZ (US); Timothy J. Hilzendeger, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 219 days.

(21) Appl. No.: 11/940,151

(22) Filed: Nov. 14, 2007

(65) Prior Publication Data

US 2009/0006056 A1 Jan. 1, 2009

Related U.S. Application Data

(60) Provisional application No. 60/946,191, filed on Jun. 26, 2007.

(51) Int. Cl.
*B64D 13/02* (2006.01)
*B24D 13/00* (2006.01)
*B60H 1/00* (2006.01)
*B64D 27/00* (2006.01)
*B64C 13/00* (2006.01)
*G05D 16/00* (2006.01)

(52) U.S. Cl. .............. 454/71; 454/70; 454/72; 454/73; 454/74; 244/59; 244/90 B; 244/99.6; 700/203; 700/301

(58) Field of Classification Search .......... 700/203, 700/301; 454/70–74; 244/59, 90 B, 99.6
See application file for complete search history.

(56) References Cited

U.S. PATENT DOCUMENTS

| | | | | |
|---|---|---|---|---|
| 3,039,206 | A | * | 6/1962 | Wilson ............... 434/30 |
| 3,376,803 | A | * | 4/1968 | Emmons ............ 454/74 |
| 3,577,902 | A | * | 5/1971 | Gardner ............. 454/71 |
| 5,520,578 | A | | 5/1996 | Block et al. |
| 6,955,184 | B2 | * | 10/2005 | Friedrichs et al. ...... 137/487.5 |
| 7,176,811 | B1 | | 2/2007 | Mark |
| 2002/0130220 | A1 | * | 9/2002 | Sparks et al. ......... 244/128 |
| 2002/0173263 | A1 | | 11/2002 | Petri et al. |
| 2003/0054324 | A1 | * | 3/2003 | Fountain ............. 434/37 |
| 2003/0093187 | A1 | * | 5/2003 | Walker .............. 701/1 |
| 2003/0157875 | A1 | * | 8/2003 | Horner et al. ........ 454/74 |
| 2004/0008253 | A1 | * | 1/2004 | Monroe ............. 348/143 |
| 2004/0238039 | A1 | * | 12/2004 | Friedrichs et al. ..... 137/487.5 |
| 2005/0153648 | A1 | * | 7/2005 | Horner et al. ........ 454/74 |
| 2006/0019594 | A1 | * | 1/2006 | Horner et al. ........ 454/74 |
| 2006/0025064 | A1 | * | 2/2006 | Horner et al. ........ 454/74 |

(Continued)

*Primary Examiner*—Ramesh B Patel
(74) *Attorney, Agent, or Firm*—Oral Caglar, Esq.

(57) ABSTRACT

Testing of an aircraft pressure control system may be performed without use of an altitude chamber. Aircraft cabin configuration date may be modeled and used, along with high resolution positional feedback from a simulated valve, to produce a high resolution electrical signal that may represent a simulated cabin pressure. A voltage-to-pressure transducer may convert the electrical signal to a pneumatic signal. The pneumatic signal may be employed to operate a cabin-pressure controller under test. The controller may operate an outflow valve actuator and an attached potentiometer. The potentiometer may produce a feedback signal and closed-loop testing of the aircraft pressure control system may thus be performed. The outflow valve actuator may be operated without being attached to an outflow valve because a simulated aerodynamic load may be applied to the actuator.

10 Claims, 6 Drawing Sheets

U.S. PATENT DOCUMENTS

2007/0063104 A1* 3/2007 Humphries .............. 244/158.1
2008/0194191 A1* 8/2008 McCoy ....................... 454/71
2008/0233854 A1* 9/2008 Horner et al. ................. 454/74
2009/0045296 A1* 2/2009 Cerchie et al. ............ 244/76 R

* cited by examiner

CLOSED-LOOP CABIN PRESSURE CONTROL SYSTEM TEST METHOD WITH ACTUAL PRESSURE FEEDBACK

CROSS-REFERENCE TO RELATED APPLICATIONS

This application claims the benefit of U.S. Provisional Application No. 60/946,191 filed Jun. 26, 2007.

BACKGROUND OF THE INVENTION

The present invention is in the field of systems that control pressure within enclosures and, more particularly, in the field of testing of pressure control systems which operate in vehicles such as aircraft.

In a typical modern aircraft, flights occur at high altitudes where atmospheric pressure is substantially lower than that which can be tolerated by aircraft passengers. Such aircraft employ a cabin-pressure control system that maintains a cabin pressure at tolerable levels irrespective of actual atmospheric pressure at the altitude in which the aircraft may be operating. Cabin-pressure control systems must have a capability of continuously modifying cabin pressure relative to atmospheric pressure. As the aircraft climbs after take-off, cabin pressure must progressively change from ground level pressure to a desired cabin pressure, e.g. a pressure that corresponds to an altitude of about 8000 ft above sea level. As the aircraft climbs above 8000 ft., relative cabin pressure (i.e. cabin pressure relative to external atmospheric pressure) must continuously increase. But, the actual internal pressure of the cabin must remain at the 8000 ft. pressure.

Conversely, as the aircraft descends for landing, the relative cabin pressure must continuously decrease to reduce the cabin altitude to the ground level pressure for when the aircraft lands. During this time, the absolute cabin pressure is increasing.

A cabin-pressure control must be constructed and tailored to operate correctly within a particular aircraft configuration. Aircraft configurations continually evolve. Consequently, cabin-pressure control systems must evolve correspondingly. Also, continuing effort is directed to improving the efficiency and accuracy of cabin-pressure controls systems. Both of these factors produce a need for evaluating the effectiveness of newly designed or newly modified cabin-pressure systems before they are actually incorporated into an operating aircraft.

In the prior art, such evaluation is performed in large altitude chambers. Such a chamber must be large enough to accommodate an aircraft cabin. The altitude chamber must be provided with a vacuum system that produces a reduced pressure at an exterior of the cabin to simulate high altitude flight. Altitude chambers are expensive to build and expensive to operate.

There is a long standing desire to be able to evaluate new designs and modification of cabin-pressure control systems with bench testing, i.e., without using altitude chambers. Computer modeling has been considered as an alternative to altitude chambers. Computer modeling has succeeded in producing preliminary evaluations, but final prior-art evaluations still require use of an altitude chamber.

Bench testing is made difficult by another factor. A full prior-art test of control system requires that it be attached to its associated outflow valves. In many types of aircraft, outflow valves are large structures that may be incorporated into a body of the aircraft. In some cases the outflow valves may be motor driven or driven by hydraulic or pneumatic actuators.

As can be seen, there is a need to provide a system for fully evaluating new designs and modifications of cabin-pressure control systems without use of an altitude chamber. Additionally there is a need to provide such a system that does not require attachment of outflow valves to the tested control system.

SUMMARY OF THE INVENTION

In one aspect of the present invention a method for testing a system for controlling pressure in an enclosure may comprise the steps of producing a first electrical signal to simulate pressure of an enclosure and producing a pneumatic signal that corresponds to the electrical signal. A pressure control system that is being tested is operated responsively to the pneumatic signal. A second electrical signal is produced responsively to the operation of the pressure control system and the second electrical signal is used to determine if the pressure-control system functions correctly.

In another aspect of the present invention a method for testing an aircraft cabin-pressure control system comprises the steps of simulating cabin-pressure, producing an electrical cabin-pressure signal and converting the electrical cabin-pressure signal to a pneumatic cabin-pressure signal. A controller of the cabin-pressure control system is operated responsively to the pneumatic cabin-pressure signal. An electric feedback is produced responsively to operation of the control system to provide closed-loop testing of the cabin-pressure control system.

In still another aspect of the present invention an apparatus for performing testing of an aircraft cabin-pressure control system comprises a self-contained transducer for converting the electrical cabin-pressure signal to a pneumatic cabin-pressure signal. The transducer comprises a proportioning valve to receive an electrical pressure signal, a jet pump for producing vacuum in the proportioning valve, an inlet for positively pressurized air; and an outlet for a pneumatic pressure signal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in evaluating and testing pressure control systems. More particularly, the present invention may provide for evaluation and testing of cabin-pressure control systems of aircraft. The present invention may be particularly useful for bench testing of cabin-pressure control systems prior to incorporation of the systems into an aircraft.

In contrast to prior-art power evaluation and testing systems, which employ altitude chambers, the present invention may employ a cabin-pressure simulator coupled to a voltage-to-pressure transducer to provide a pneumatic pressure signal that is transmitted to the control system being tested. The control system may respond to the pneumatic pressure signal and command movement of an outflow-valve actuator. The actuator may produce an electrical feed-back signal to the pressure simulator, which simulator may, in turn, respond to the feedback signal. Closed-loop testing may thus be performed on the control system without use of an altitude chamber.

Figure 1:
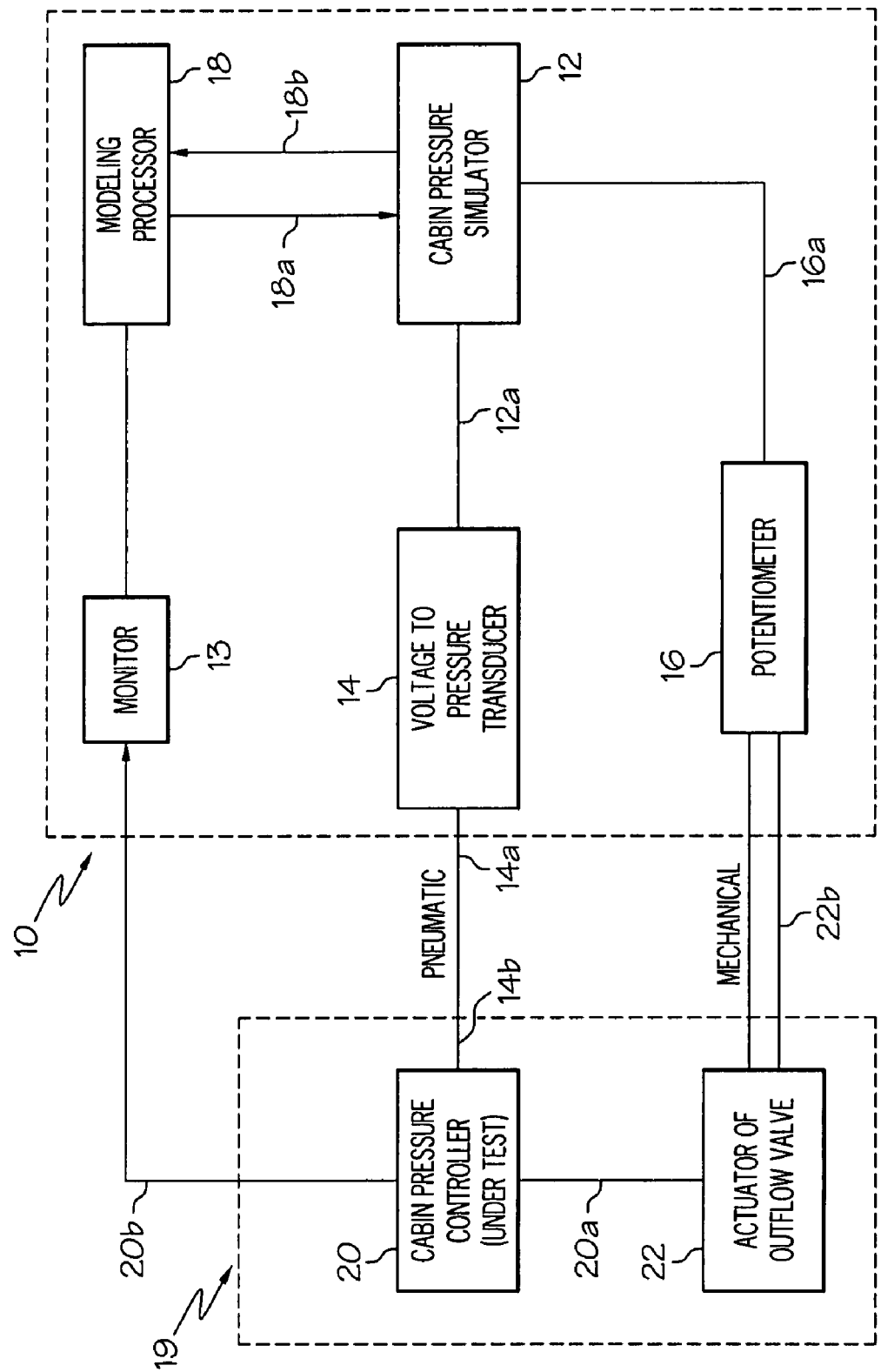
FIG. 1 is a block diagram of a system for testing a pressure-control system in accordance with the present invention.

Referring now to FIG. 1, a cabin-pressure testing system, designated generally by the numeral 10, is shown in block diagram form. The testing system 10 may comprise a cabin pressure simulator 12, a monitor 13, a voltage-to-pressure transducer 14, a potentiometer 16 and a modeling processor 18.

In operation, the cabin pressure simulator 12 may be provided with detailed aircraft configuration data from the modeling processor 18 via an interconnection 18a. The modeling processor 18 may also provide data to the simulator 12 that defines expected or specified performance characteristics of the control system 10. By way of example, this data may be provided in digital format. The cabin-pressure simulator 12 may produce a cabin pressure output signal 12a that is correlated with the aircraft configuration data. The signal 12a may be provided in an analog or digital format. The signal 12a may be processed in the voltage-to-pressure transducer 14. The transducer 14 may produce a pneumatic signal 14a. The signal 14a may be provided as an increase or decrease of air pressure in an output connector 14b. The pneumatic signal 14a may be very sensitive. In order to proper simulate actual cabin pressure response the signal 12a may be produced by simulator 12 with a 16-bit or better resolution. This may preclude generation of pressure steps that could cause inadvertent overdrive of the cabin pressure controller 20, The connector 14b may be attached to a controller of a cabin-pressure system that is to be evaluated or tested. In the present exemplary embodiment of the invention, the control system to be tested is designated by the numeral 19. The control system 19 may comprise a controller 20 and an outflow valve actuator 22. The controller 20 may be interconnected with the actuator 22 so that the actuator 22 may respond to an actuator signal 20a from the controller 20. The actuator signal 20a may be electrical, pneumatic or hydraulic depending on the nature of the control system 20 and the actuator 22.

The controller 20 may communicate with monitor 13, via 20b, for insight into actual calculations and logic steps that the controller 20 may be performing. This has the advantage of allowing improvements to be made during the development of the system.

The actuator 22 may be mechanically connected to the potentiometer 16, or a similar rotary or linear position sensor of adequate output resolution, with a mechanical connector or drive shaft 22b. As the actuator 22 moves in response to the actuator signal 20a, its motion may vary a potentiometer signal 16a. The signal 16a may be received by the cabin-pressure simulator 12 and thus complete a closed control loop. In this exemplary embodiment, at least 16-bits of analog-to-digital data may be required by pressure simulator 12 to ensure that the pneumatic output response is not producing inordinately large pressure steps. The pressure steps should not exceed an actual cabin pressure response would may occur in a cabin of an actual airplane. In that regard, the potentiometer 16 may be considered a detector for operations of the actuator 22. The simulator 12 may increase or decrease the signal 12a if the potentiometer signal 16a is indicative of a changing response of the controller 20 and the actuator 22. Variations in the signal 12a may be viewed with the modeling processor 18 with a signal 18b and then forwarded to the monitor 13, with a signal 13a, for comparison against known expected results and performance evaluation.

Figure 2:
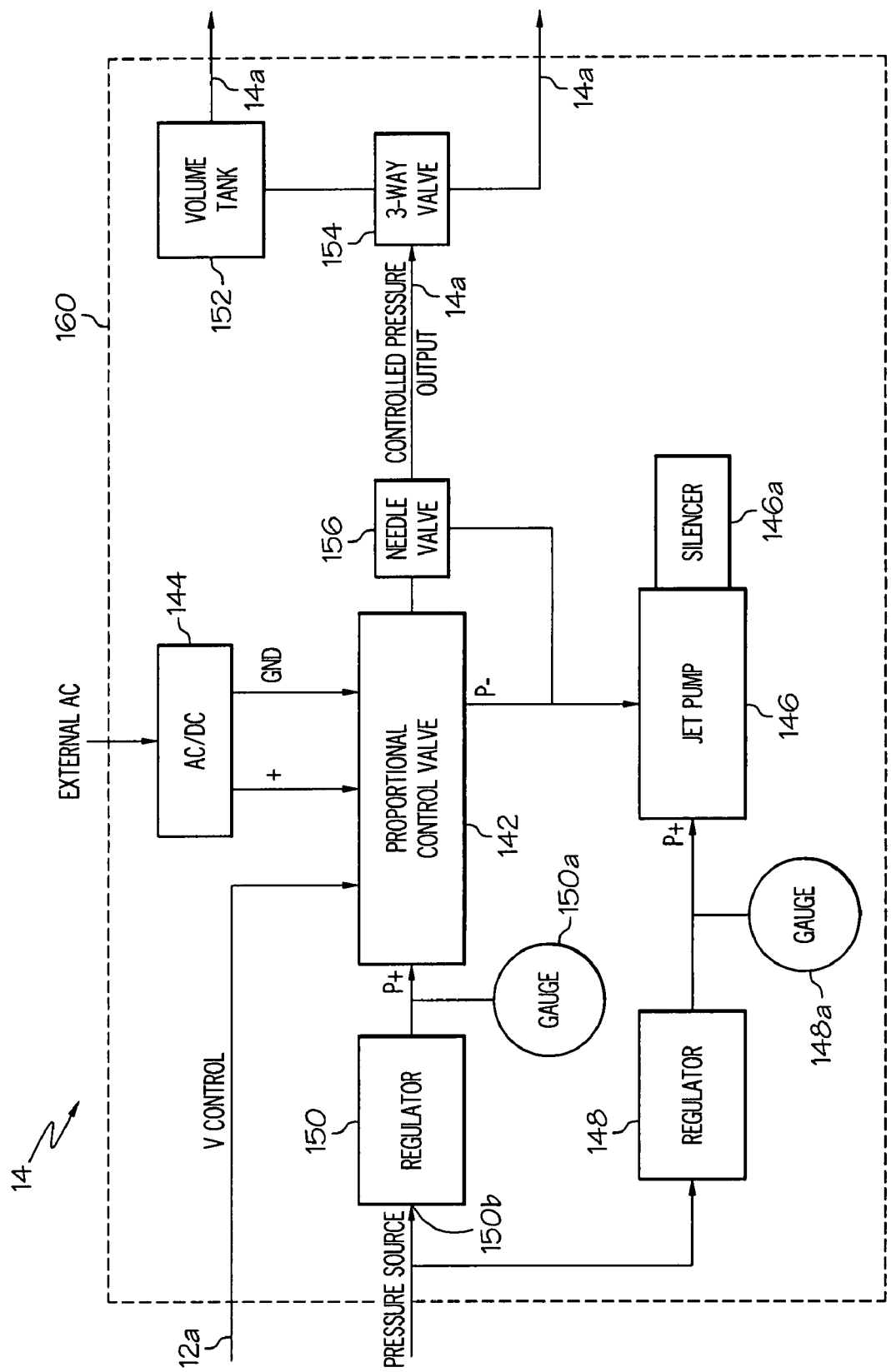
FIG. 2 is a block diagram of a voltage-to-pressure transducer in accordance with the invention.

Referring now to FIG. 2 an exemplary embodiment of the voltage-to-pressure transducer 14 is illustrated in block diagram form. The transducer 14 may comprise a proportional control valve 142 which may be interconnected to laboratory power (not shown) with an AC to DC converter 144. A jet pump 146 may produce vacuum (i.e. negative pressure relative to atmospheric pressure) and provide the vacuum to the proportioning valve 142. The jet pump 146 may produce vacuum, via "venturi effect", by an external source (not shown) of high-pressure air delivered through a regulator 148 to an inlet of 146. The high-pressure air may also be delivered to the proportioning valve 142 through a regulator 150. Gauges 148a and 150a may be provided to monitor output pressures of the regulators 148 and 150 respectively.

A control signal, e.g. the signal 12a of FIG. 1, may be provided to the proportioning valve 142 in an analog format with a resolution that corresponds to at least 16 bits of digital resolution. The proportioning valve 142 may produce a pneumatic output signal, e.g., the signal 14a of FIG. 1 with a correspondingly high 16 bit resolution. The valve 142 may combine positively pressurized air provided to an inlet 150b of the regulator 150, vacuum from the jet pump 146, electrical power from the converter 144 and the signal 12a to produce a pneumatic pressure signal (e.g., the signal 14a of FIG. 1).

The transducer 14 may be provided with other control elements, for example, a volume tank 152, with a capacity of about 150 cubic centimeters, may be provided for reducing high-frequency pressure transients. A three-way valve 154 may be employed to allow a selective determination of whether or not the volume tank should be employed. A needle valve 156 may be employed to ensure a continuous flow of air to the jet pump 146 from the valve 142.

The transducer 14 may be self-contained and readily adapted for bench testing operations. Electrical power to the transducer may be provided from a conventional 115 volts AC power source. The transducer 14 may be enclosed within a portable cabinet or case 160. Furthermore, the jet pump 146 may be provided with a silencer 146a to enhance working conditions in the vicinity of the transducer 14.

Figure 3:
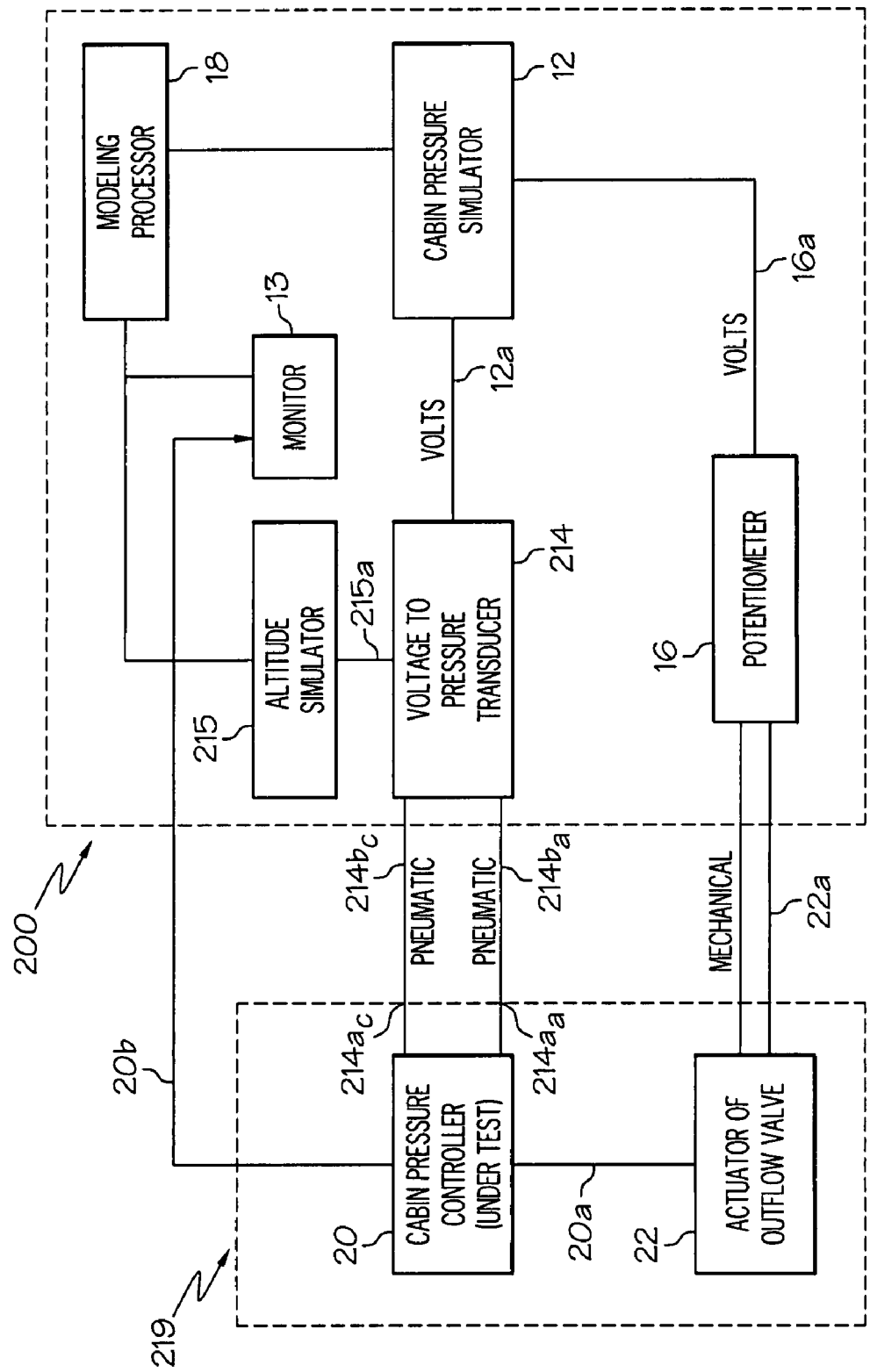
FIG. 3 is a block diagram of an alternate exemplary embodiment of the system of FIG. 1 in accordance with the present invention.

Referring now to FIG. 3, another exemplary embodiment of the invention is shown in block form. A cabin-pressure testing system is designated generally by the numeral 200. The system 200 may comprise the cabin pressure simulator 12, the monitor 13, a voltage-to-pressure transducer 214, an altitude simulator 215, the potentiometer 16 and the modeling processor 18.

In operation, the cabin pressure simulator 12 may be provided with detailed aircraft configuration data from the modeling processor 18. In operation, the cabin pressure simulator 12 may also be provided with actuator 22 rotational position feedback 16a. The cabin-pressure simulator 12 may produce a cabin pressure output signal 12a and an altitude simulator 215 may produce an altitude signal 215a. The signals 12a and 215*a* may be processed in the voltage-to-pressure transducer 214. The transducer may produce two pneumatic signals 214$a_c$ and 214$a_a$. The signal 214$a_c$ and 214$a_a$ may be provided as increases or decreases of air pressure in output connector 214$b_c$ and 214$b_a$ respectively. It may be seen that the testing system 200 may perform testing on one of the control systems to be tested. In this case the control system is designated generally by the numeral 219. The control system 219 may require both cabin pressure and altitude inputs for proper operation. As to all other aspects of its operation, the testing system 200 may function in the same manner as the testing system 10 of FIG. 1. The testing systems 10 and 200 of the present invention may perform testing on many possible configurations of the controllers 20 and the actuators 22.

Figure 4:
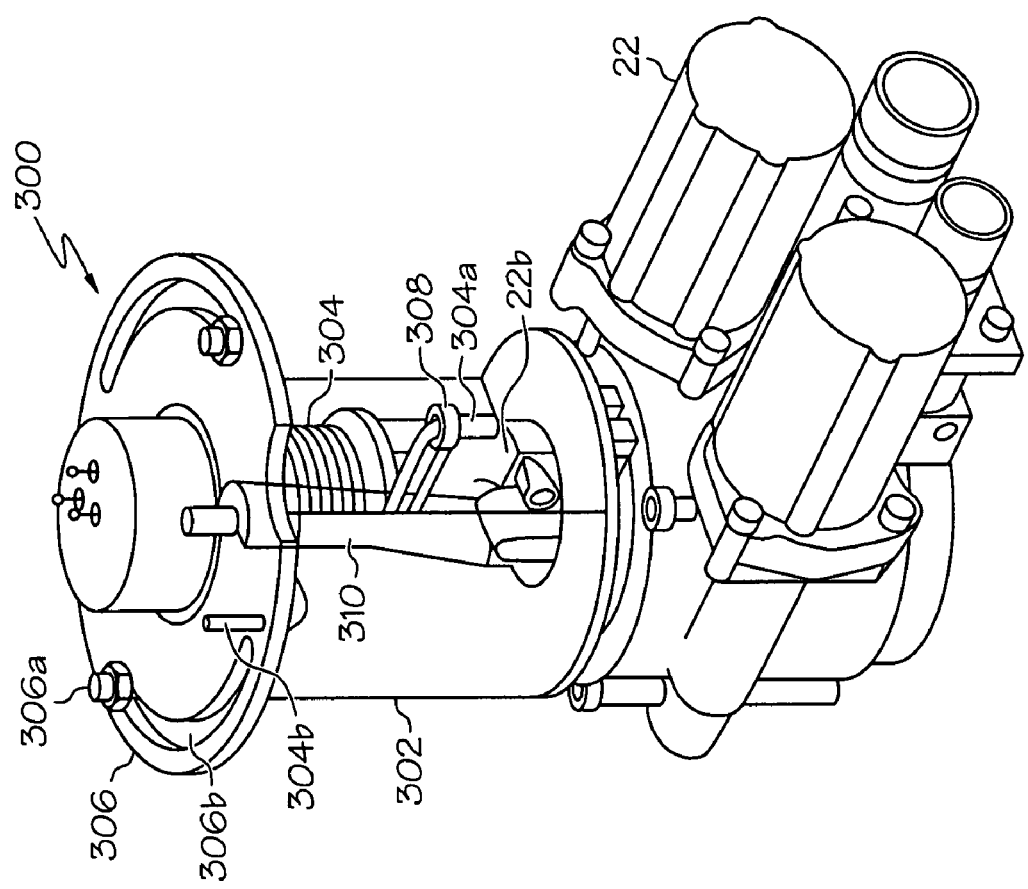
FIG. 4 is a perspective view of an aerodynamic load and valve simulator in accordance with the invention.

Referring now to FIG. 4, it may be seen how the inventive testing systems 10 and 200 may provide testing and evaluation of one of the control systems 19 even if its associated outflow valves are not present in the test. An aerodynamic load and outflow valve simulator 300 is shown attached to an exemplary one of the outflow-valve actuators 22. The aerodynamic load and outflow valve simulator 300 may comprise a support 302, a torsion spring 304, an adjusting plate 306 and a spring attachment plate 308.

The aerodynamic load and outflow valve simulator 300 may provide torsion on the actuator 22 during operation of the actuator 22. This torsion may simulate the aerodynamic load conditions that exist in an operating aircraft. In an operating aircraft, airflow may produce continuous back-pressure forces (e.g., aerodynamic loads) on vanes of the outflow valve (not shown). In the presence of such aerodynamic loads forces, the actuator 22 may continuously drive against a mechanical load. In such in-flight conditions, the actuator 22 may not experience backlash. However, if the actuator 22 were allowed to experience backlash during testing of the control system 20, accuracy of testing would be adversely affected. This is because the actuator 22 under test may not operate in a manner that accurately simulates in-flight conditions.

Consider, for example, a case in which the controller 20 commands a 10 degree rotation of the actuator 22. If the actuator 22, because of backlash, had been allowed to drift backwards from its previous position by, for example 2 degrees, then a 10 degree command may produce a net forward rotation of only 8 degrees (a commanded 10 degrees minus a 2 degree backlash). If, on the other hand, backlash were prevented during the test, then the 10 degree command may produce an actual 10 degree rotation just as it would in an in-flight aircraft.

It may be seen then, that when backlash is eliminated from operation of the actuator 22, the testing systems 10 and 200 may operate accurately and effectively even though outflow valves are not present in the test. The valve simulator 300 may provide this desirable functionality.

In operation, the aerodynamic load and outflow valve simulator 300 may be attached to the actuator 22. The drive shaft 22*b* of the actuator may be positioned within the support 302. The drive shaft 22*b* may be free to rotate relative to the support 302. Drive shaft 22*b* may be engaged with valve simulator 300 via valve simulator shaft 310. A spring attachment plate 308 may be engaged with the valve simulator shaft 310. A first end 304*a* of the torsion spring 304 may be attached to the plate 308. A second end 304*b* of the torsion spring may be attached to the adjusting plate 306. The adjusting plate 306 may be adjustably located relative to the support 302 with fasteners 306*a* and slotted holes 306*b*.

The torsion spring 304 may produce a continuous closing torque on the shaft 310. The closing torque may be present whether or not the shafts 22*b* and 310 may be rotating. Thus, backlash of the shaft 22*b* may be eliminated. It is important that the adjusting plate 306 is properly positioned so that the torsion spring 304 does not produce excessive torque, beyond the actual torque expected in actual flight that may cause backward motion of the shaft 22*b*. The adjusting plate 306 may require re-positioning for different types of the actuators 22.

Fixed to valve simulator shaft 310 is position sensor (e.g. the potentiometer 16 of FIG. 1). Thus the potentiometer 16 may also be rotationally fixed to actuator shaft 22*b*. Referring to FIGS. 1 and 3, it may be seen that rotational output of actuator 22 may be mechanically transferred to the potentiometer 16 to provide an accurate signal 16*a* to pressure simulator 12.

Figure 5:
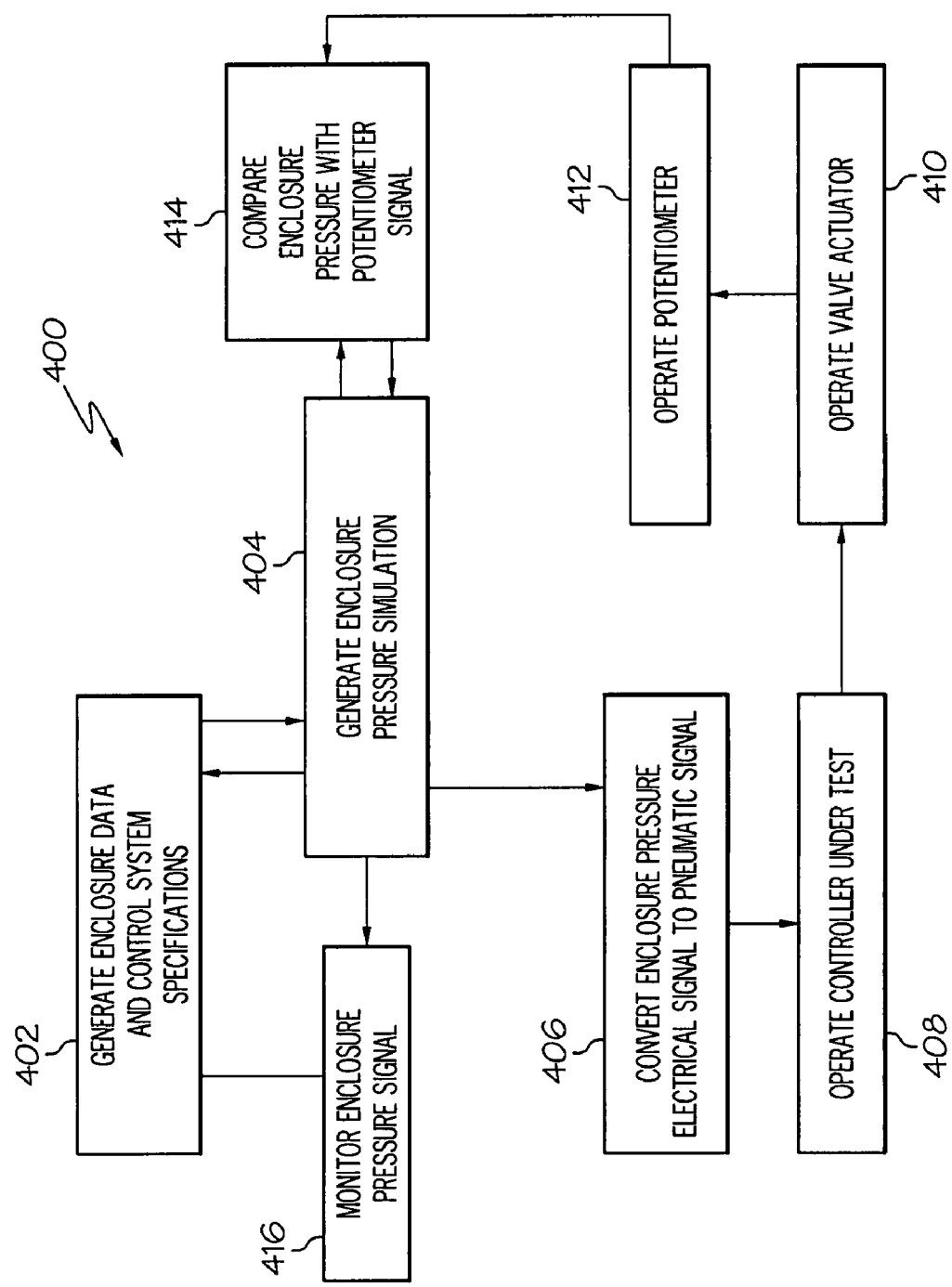
FIG. 5 is a flow chart of a method for testing a pressure-control system in accordance with the present invention.

While the present invention is described hereinabove in the context of aircraft application, it should be noted that the present invention may have wider applicability. In one embodiment of the present invention, a method may be provided for testing systems that may control pressure not only in aircraft cabins but in many other types of enclosures, such as buildings or portions of buildings e.g. "clean rooms". In that regard the method may be understood by referring to FIG. 5. In FIG. 5, a flow chart portrays various aspects of an inventive method 400.

In a step 402 configuration data of an enclosure may be generated (e.g. by the modeling processor 18). In a step 404, a first simulated enclosure-pressure signal may be generated (e.g. the electrical signal 12*a* may be generated by the cabin pressure simulator 12). In a step 406 the electrical signal of step 404 may be converted into a pneumatic signal (e.g. the signal 14*a* produced by the voltage-to-pressure transducer 14).

In a step 408, a pressure controller under test (e.g. the cabin pressure controller 20) may be operated responsively to the pneumatic signal produced in step 406. In a step 410, a valve actuator may be operated (e.g. the actuator 22 may be operated responsively to the signal 20*a* produced by the controller 20). In a step 412, a potentiometer may be operated by the valve actuator (e.g. the potentiometer 16 may be operated by motion of the actuator 22 through the mechanical connector 22*b*). In the step 412, an electrical signal may be generated and transmitted to a comparison step 414. In the step 414, comparison may be made of the signal from step 412 with the signal from step 404 and data from the step 402. The simulator may generate a second enclosure-pressure signal at a magnitude that may be determined in the step 414. The steps 404 through 414 may be performed repeatedly so that a continuum of signals may be provided for a closed-loop testing of the pressure control system under test.

In a step 416, the enclosure-pressure signal may be continuously monitored and compared to a signal from the modeling processor which performs the step 402. In this manner, operating characteristics of the control system under test may be observed.

Figure 6:
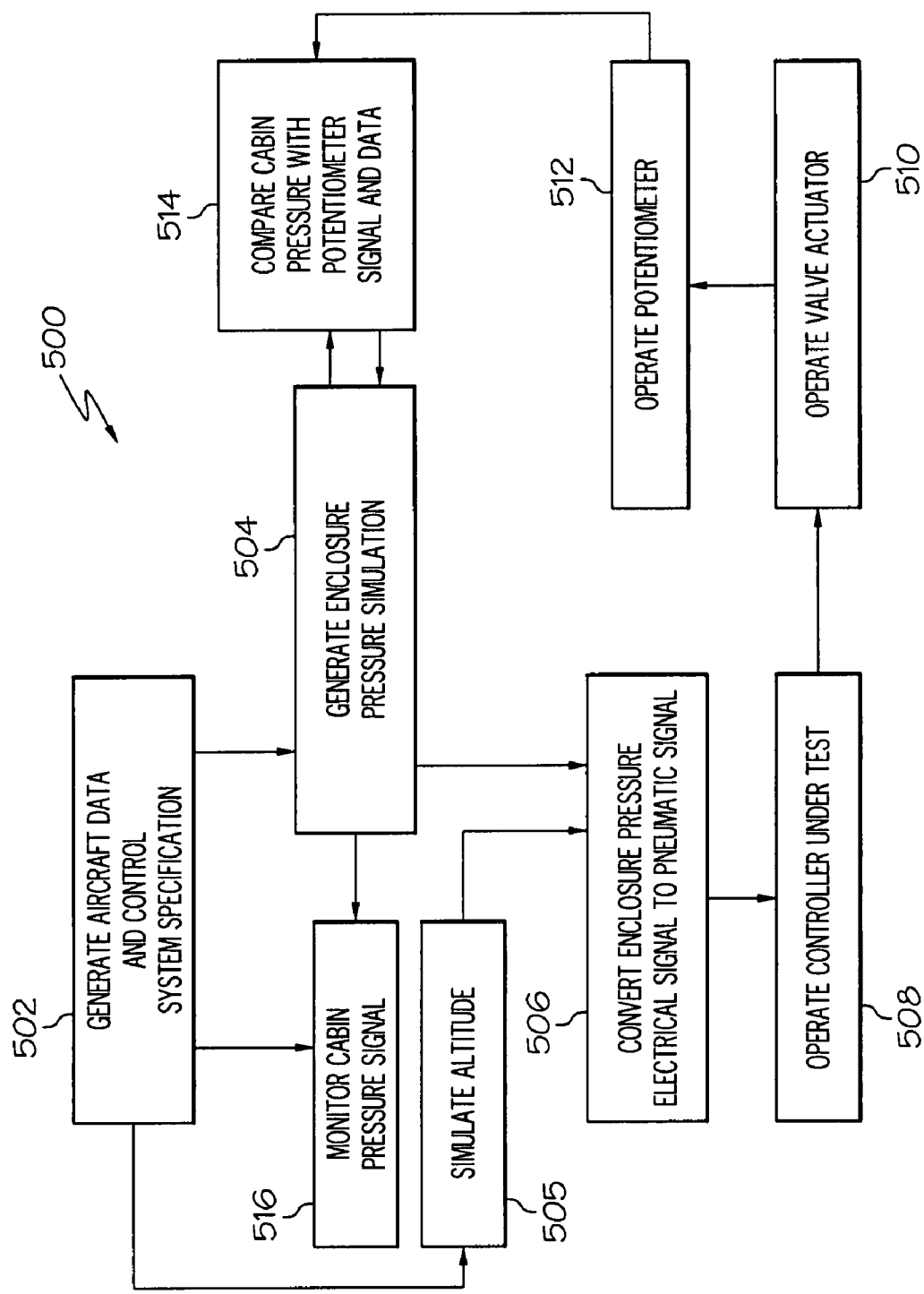
FIG. 6 is a flow chart of alternate embodiment of a method for testing a pressure-control system in accordance with the present invention.

In another embodiment of the present invention, a method is provided for testing a system for controlling pressure in a vehicle or a portion of a vehicle, for example, an aircraft cabin. In that regard the method may be understood by referring to FIG. 6. In FIG. 6, a flow chart portrays various aspects of an inventive method 500.

In a step 502 aircraft configuration data may be generated (e.g. by the modeling processor 18). In a step 504, a simulated cabin pressure signal may be generated (e.g. the electrical signal 12*a* may be generated by the cabin pressure simulator 12). In a step 505 an electrical altitude simulation signal may be produced (e.g. the signal 215*a* may be produced by the altitude simulator 215). In a step 506 the electrical signals of steps 504 and 505 may be converted into pneumatic signals (e.g. the signal 214$a_c$ and 214$a_a$ produced by the voltage-to-pressure transducer 214).

In a step 508, a pressure controller under test (e.g. the cabin pressure controller 20) may be operated responsively to the pneumatic signals produced in step 506. In a step 510, a valve actuator may be operated (e.g. the actuator 22 may be operated responsively to the signal 20$a$ produced by the control system 20). In a step 512, a potentiometer may be operated by the valve actuator (e.g. the potentiometer 16 may be operated by motion of the actuator 22 through the mechanical connector 22$b$. In the step 512, an electrical signal may be generated and transmitted to a comparison step 514 in which the signal from the step 512 may be compared with the signal from the step 504 and with data from the step 502. Completion of the steps 504 through 514 may thus provide a closed-loop test of the pressure control system under test in the manner described above with respect to the method 400. In a step 516, the cabin pressure signal may be monitored to observe operating characteristics of the control system under test may be observed.

It should be understood, of course, that the foregoing relates to exemplary embodiments of the invention and that modifications may be made without departing from the spirit and scope of the invention as set forth in the following claims.

We claim:

1. A method for testing aircraft cabin-pressure controllers, comprising the steps of:
   simulating cabin-pressure;
   producing an electrical cabin-pressure signal;
   converting the electrical cabin-pressure signal to a pneumatic cabin-pressure signal;
   applying the pneumatic cabin-pressure signal to a controller-under-test;
   operating the controller-under-test responsively to the pneumatic cabin-pressure signal; and
   producing an electric feedback responsively to operation of the controller-under-test to provide closed-loop testing of the controller-under-test.

2. The method of claim 1 wherein the step of simulating cabin pressure is performed without use of an altitude chamber.

3. The method of claim 1 further comprising:
   producing an electrical altitude simulation signal; and
   producing pneumatic signaling to the controller-under-test so that it operates responsively to both the pneumatic cabin pressure signal and the altitude simulation signal.

4. The method of claim 1 further comprising:
   modeling aircraft configuration data in digital format; and
   wherein the step of producing the electrical cabin-pressure signal is performed responsively to the configuration data and positional feedback from an outflow valve simulator.

5. The method of claim 1 wherein step of producing an electric feedback comprises operating an actuator of an outflow valve and an attached potentiometer to produce an electrical signal that is responsive to operation of the controller-under-test.

6. The method of claim 5 wherein:
   the step of operating the actuator is performed with a simulated aerodynamic load applied to the actuator; and
   the step of operating the actuator is performed without actual operation of an outflow valve.

7. Apparatus for performing testing of aircraft cabin-pressure controllers comprising:
   a cabin pressure simulator for producing an electrical simulated cabin-pressure signal;
   a self-contained transducer for converting the electrical simulated cabin-pressure signal to a pneumatic cabin-pressure signal for application to a controller-under-test,
   an outflow valve actuator that is operated by the controller-under-test;
   a detector for producing a detector signal responsive to position of the output valve actuator; and
   wherein the detector signal is directed to the cabin pressure simulator so that closed-loop testing of the controller-under-test is provided.

8. The apparatus of claim 7 wherein:
   the cabin pressure simulator has at least 16-bits of analog resolution; and
   the detector can receive an analog signal with at least 16-bits of analog resolution.

9. The apparatus of claim 7 further comprising:
   a processor that models aircraft configuration data; and
   wherein the cabin-pressure simulator produces the electrical simulated cabin-pressure signal responsively to the aircraft configuration data and positional feedback of the outflow valve actuator.

10. The apparatus of claim 7 wherein the transducer comprises;
    a proportioning valve to receive an electrical pressure signal;
    a jet pump for producing vacuum in the proportioning valve;
    an inlet for positively pressurized air; and
    an outlet for a pneumatic pressure signal.

* * * * *